(12) United States Patent
Williams et al.

(10) Patent No.: US 10,093,042 B2
(45) Date of Patent: *Oct. 9, 2018

(54) HYBRID COMPOSITE CYLINDER HEAD

(71) Applicant: FORD GLOBAL TECHNOLOGIES, LLC, Dearborn, MI (US)

(72) Inventors: Rick L. Williams, Canton, MI (US); Mark Michael Madin, Canton, MI (US); Christopher Donald Wicks, Allen Park, MI (US); Clifford E. Maki, New Hudson, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 460 days.

This patent is subject to a terminal disclaimer.

(21) Appl. No.: 14/619,496

(22) Filed: Feb. 11, 2015

(65) Prior Publication Data

US 2016/0230696 A1    Aug. 11, 2016

(51) Int. Cl.
| | |
|---|---|
| *B29C 43/18* | (2006.01) |
| *B29C 43/00* | (2006.01) |
| *F02F 1/24* | (2006.01) |
| B29C 45/14 | (2006.01) |
| B29K 101/10 | (2006.01) |
| B29K 105/12 | (2006.01) |
| B29L 31/00 | (2006.01) |

(52) U.S. Cl.
CPC ............ *B29C 43/18* (2013.01); *B29C 43/003* (2013.01); *F02F 1/24* (2013.01); *B29C 45/14336* (2013.01); *B29C 2043/181* (2013.01); *B29K 2101/10* (2013.01); *B29K 2105/12* (2013.01); *B29L 2031/748* (2013.01); *F05C 2225/00* (2013.01)

(58) Field of Classification Search
CPC .................................. B29C 43/18; F02F 1/24
See application file for complete search history.

(56) References Cited

U.S. PATENT DOCUMENTS

| | | | |
|---|---|---|---|
| 4,003,422 A | 1/1977 | Schramm et al. | |
| 4,341,826 A | 7/1982 | Prewo et al. | |
| 4,785,773 A * | 11/1988 | Schreiber ................ | F01L 1/053 |
| | | | 123/193.3 |
| 4,852,542 A * | 8/1989 | Kamo ..................... | F02B 77/02 |
| | | | 123/188.3 |
| 5,083,537 A | 1/1992 | Onofrio et al. | |
| 5,540,553 A * | 7/1996 | Goto ................... | B29C 45/0005 |
| | | | 416/241 A |
| 5,638,779 A * | 6/1997 | Atmur ..................... | F02B 41/00 |
| | | | 123/193.2 |
| 5,657,729 A | 8/1997 | Atmur et al. | |
| 5,769,046 A | 6/1998 | Ransone | |
| 5,908,016 A | 6/1999 | Northam et al. | |

* cited by examiner

*Primary Examiner* — Kevin A Lathers
(74) *Attorney, Agent, or Firm* — Brooks Kushman P.C.

(57) ABSTRACT

An engine cylinder head comprising an internal metal structure formed from a metal material and an external polymer composite structure formed from a polymer composite material, wherein the external polymer composite structure at least partially surrounds the internal metal structure.

20 Claims, 3 Drawing Sheets

HYBRID COMPOSITE CYLINDER HEAD

TECHNICAL FIELD

The invention is directed to components of an internal combustion engine, including a hybrid composite cylinder head having an internal metal structure and an external polymer structure.

BACKGROUND

Cylinder heads are typically made out of metal such as aluminum or cast iron. Metal cylinder heads may suffer from one or more disadvantages. The cast iron cylinder heads are heavy and exhibit low thermal conductivity. Aluminum cylinder heads are more expensive to make. Moreover, some aluminum cylinder heads may exhibit inadequate corrosion resistance and unacceptable thermal expansion for certain applications. Alternatives to metal cylinder heads have been proposed. For example, partially ceramic cylinder heads or fiber reinforced ceramic matrix composite cylinder heads have been proposed. However, such cylinder heads may exhibit limited thermal and peak pressure carrying capabilities.

SUMMARY

An engine cylinder head comprising an internal metal structure formed from a metal material and an external polymer composite structure formed from a polymer composite material, wherein the external polymer composite structure at least partially surrounds the internal metal structure. The polymer composite material may include a fiber material. The internal metal structure may form an upper portion of a combustion chamber. The internal metal structure may form a combustion chamber insert. The internal metal structure may include a fire deck. The fire deck may include a plurality of engine coolant ports, a plurality of oil drain ports, or both. The inner portion may be made from cast iron. The external polymer composite structure may be made from a thermoset resin. The thermoset resin may include a polyester resin, an epoxy resin, a phenolic resin, a polyurethane, a polyimide, a silicone, or a combination thereof. The thermoset resin may be a polyester resin. The fiber material may include carbon fiber, aramid fiber, glass fiber, lignocellulosic fiber, chemically modified cellulose fiber, or a combination thereof. The external polymer composite structure may include one or more intake and exhaust oil feeds for a hydraulic lash adjuster. The external polymer composite structure may include one or more spark plug and direct injection pockets.

An engine cylinder head comprising an internal metal structure formed from a metal material and including a fire deck; an external polymer composite structure formed from a polymer composite material including a fiber material and including one or more intake and exhaust oil feeds for a hydraulic lash adjuster and one or more spark plug and direct injection pockets, wherein the external polymer composite structure at least partially surrounds the internal metal structure.

A method of forming an engine cylinder head comprising forming an internal metal structure of a metal material; and molding an external polymer composite structure of a polymer composite material over the internal metal structure so that the external polymer composite at least partially surrounds the inner metal structure. The polymer composite material may include a fiber material. The internal metal structure forming step may include casting the internal metal structure. The method may further comprise forming one or more components of the internal metal structure. The internal metal structure forming step may include machining one or more components of the internal metal structure. The method may further comprise adding a coating to a surface of the internal metal structure. The molding step may include injection molding or compression molding the external polymer composite structure.

DETAILED DESCRIPTION

Figure 1:
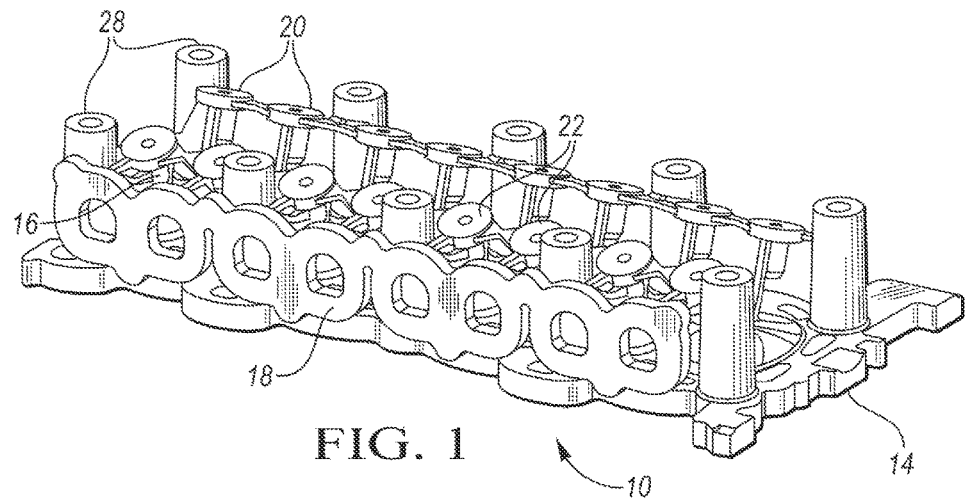
FIG. 1 depicts a perspective side view of an internal structure of a hybrid composite cylinder head in accordance with one embodiment.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

An internal combustion engine includes an engine with one or more cylinders. Each of the cylinders is covered with a cylinder head which sits above each cylinder and on top of a cylinder block. The cylinder head closes at the top of the cylinder and thus forms a combustion chamber. In addition, the cylinder head provides space for the passages that feed air and fuel to the cylinder and allow exhaust to escape. The cylinder head may also be a suitable location to mount spark plugs, valves, and fuel injectors.

Cylinder heads are typically made out of metal such as aluminum or cast iron. Potential disadvantages of cylinder heads made completely from cast iron include relatively high weight and low thermal conductivity. Aluminum cylinder heads are typically half the weight of an equivalent cast iron cylinder heads and about three times better in terms of thermal conductivity. However, aluminum cylinder heads may be too expense, provide insufficient corrosion resistance, may be too soft for certain applications, and may exhibit high thermal expansion. An alternative to the metal cylinder heads is a cylinder head partially formed from a ceramic material. For example, U.S. Pat. No. 5,657,729 discloses a metal heat sink coupled to an upper portion of the ceramic section within a combustion chamber. Additionally, U.S. Pat. No. 5,657,729 discloses a fiber reinforced ceramic matrix composite cylinder head and cylinder head liner. However, such composite cylinder heads have a limited thermal and peak pressure carrying capabilities. Additionally, ceramic materials cannot be molded around a metal skeleton of the cylinder head.

Therefore, there remains a need to develop a cylinder head which would contain the combustion pressure and thermal loading while being lightweight and thus contribute to better fuel efficiency. It is also desirable to provide a cylinder head which would have other advantages such as good corrosion resistance, thermal benefits, maintained rigidity, and/or reduced number of machine operations during production of the cylinder head.

A hybrid composite cylinder head as disclosed herein solves one or more problems described above and/or provides the benefits identified above. The hybrid composite cylinder head as disclosed herein is suitable for use in a variety of engines. For example, the hybrid composite cylinder head may be used in a gasoline direct injection engine and/or gasoline/diesel port fuel injection engine.

According to one or more embodiments, the hybrid composite cylinder head is capable of withstanding temperatures of 150° C. or less, 100° C. or less, 50° C. or less, 0° C. or less, −20° C. or less, −40° C. or less, −60° C. or less, or −80° C. or less. The hybrid composite cylinder head is capable of withstanding temperatures of 90° C. or more, 110° C. or more, 150° C. or more, 200° C. or more, 250° C. or more, 300° C. or more, or 350° C. or more. The hybrid composite cylinder head is capable of withstanding a coolant pressure of 0.5 bar or more, 0.75 bar or more, 1 bar or more, or 1.5 bar or more. The hybrid composite cylinder head is capable of withstanding a cylinder pressure of 50 bar or more, 75 bar or more, 100 bar or more, 125 bar or more, or 150 bar or more.

According to one or more embodiments, as shown in FIGS. 1-5, the hybrid composite cylinder head 1 includes an internal metal structure 10 and a composite material external structure 12. The hybrid composite cylinder head 1 has a relatively low weight compared to a metal cylinder head. The hybrid component cylinder head 1 offers additional advantages. For example, a combination of the internal metal structure 10 and the external polymer composite structure 12 allows for better organization of the complicated internal shape of the cylinder head 1. For example, a coolant circuit of a composite cylinder head 1 is better organized in comparison to traditional metal cylinder heads. The hybrid composite cylinder head 1 allows for optimized heat transfer so that the heat is retained where it is desirable.

Figure 2:
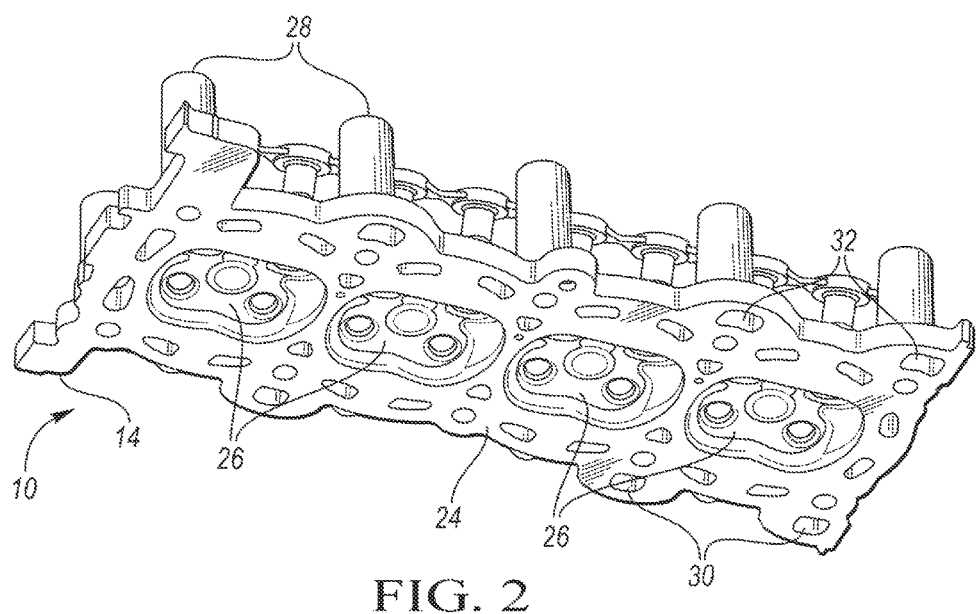
FIG. 2 depicts a perspective bottom view of an internal structure of a hybrid composite cylinder head in accordance with one embodiment.

As can be seen in FIGS. 1 and 2, the internal metal structure 10 may be a section forming an upper portion of a combustion chamber. The internal metal structure 10 may include a combustion chamber insert 14. As illustrated in FIGS. 1 and 2, the internal metal structure 10 may contain the following components of the cylinder head: one or more valve stem guides 16, an exhaust face 18, one or more intake valve spring seats 20, one or more exhaust valve spring seats 22, a fire deck 24, one or more domes of one or more combustion chambers 26, one or more head bolt columns 28, or a combination thereof. The fire (head) deck 24 may include one or more intake and/or exhaust ports, which are passages cast into the internal metal structure 10 of the cylinder head 1 leading from manifolds to respective valves. As can be seen in FIG. 2, the fire deck 24 may include a plurality of engine coolant ports 30 and a plurality of oil drain ports 32.

It is contemplated that at least some of the above-mentioned components could be included in the external polymer composite structure 12 instead of the internal metal structure 10. However, it is desirable to provide at least some of the parts, such as the fire deck 24 and the exhaust face 18, as part of the internal metal structure 10 because the fire deck 24 and the exhaust face 18 may be exposed to temperatures higher than the composite material may withstand. Additionally, the inclusion of one or more of the above-mentioned components in the internal metal structure 10 allows for reduction or prevention of fatigue failure of the cylinder head due to exposure to alternating stresses. The internal metal structure 10 is capable of carrying a static and dynamic load while the external polymer composite structure 12 is not required to carry a static load. The head bolt columns 28 mitigate a static load imparted by the metal material. Further still, forming one or more of the above-mentioned components from metal has further advantages. For example, the fire deck 24 adds structural stiffness, structural flatness, and sealability to the internal metal structure 10, as well as maintains the dimensional stability of one or more domes of the combustion chambers 26.

The internal metal structure 10 may be made from aluminum, texturized aluminum, cast iron, CGI iron, steel, or another metal, depending on the specific engine application. The internal metal structure 10 may be made from one or more alloys. For example, the internal metal structure 10 may be made from an aluminum alloy comprising copper, silicon, manganese, magnesium, the like, or a combination thereof. An addition of silicon and/or copper reduces thermal expansion and contraction, durability, and castability of the internal metal structure 10. An addition of copper promotes age-hardening. An addition of manganese and/or magnesium improves strength of the alloy. Because the internal metal structure 10 forms a portion of a combustion chamber, the material of the internal metal structure 10 has to withstand increase in temperature and pressure during the combustion process. The type of material used for the internal metal structure 10 may be adjusted depending on the needs of a specific application.

The external polymer composite structure 12 may be formed from a composite material and at least partially surround the internal metal structure 10 of the cylinder head. The external polymer composite structure 12 may include reinforced polymer material. The external polymer composite structure 12 may include a thermoplastic material. The external polymer composite structure 12 may include a thermoset resin. The thermoset resin may include a polyester resin, an epoxy resin, a phenolic resin, a polyurethane, a polyimide, a silicone, or other type of resins, and combination thereof. The external polymer composite structure 12 may be reinforced with a fibrous material. The external polymer composite structure 12 may include fiber-reinforced polymers. For example, the external polymer composite structure 12 may be reinforced with carbon fiber, aramid fiber, glass, basalt, the like, or a combination thereof. The external polymer composite structure 12 may be reinforced with lignocellulosic fibers such as cotton, wool, flax, jute, coconut, hemp, straw, grass fiber, and other fibers available directly from natural sources, as well as chemically modified natural fibers, for example chemically modified cellulose fibers, cotton fibers, etc. Suitable natural fibers also include abaca, cantala, caroa, henequen, istle, mauritius, phormium, bowstring, sisal, kenaf, ramie, roselle, sunn, cadillo, kapok, broom root, coir, crin vegetal, and piassava. These lists of natural fibers are illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like.

In one or more embodiments, the external polymer composite structure 12 includes a thermoset resin reinforced with carbon fibers to increase stiffness, provide the desired weight reduction, excellent fatigue resistance, and chemical resistance. Carbon fibers are also suitable due to their high strength-to-weight and stiffness-to-weight ratio. However, any type of fiber is suitable and a specific composition of the composite material depends on a particular engine application.

Figure 3:
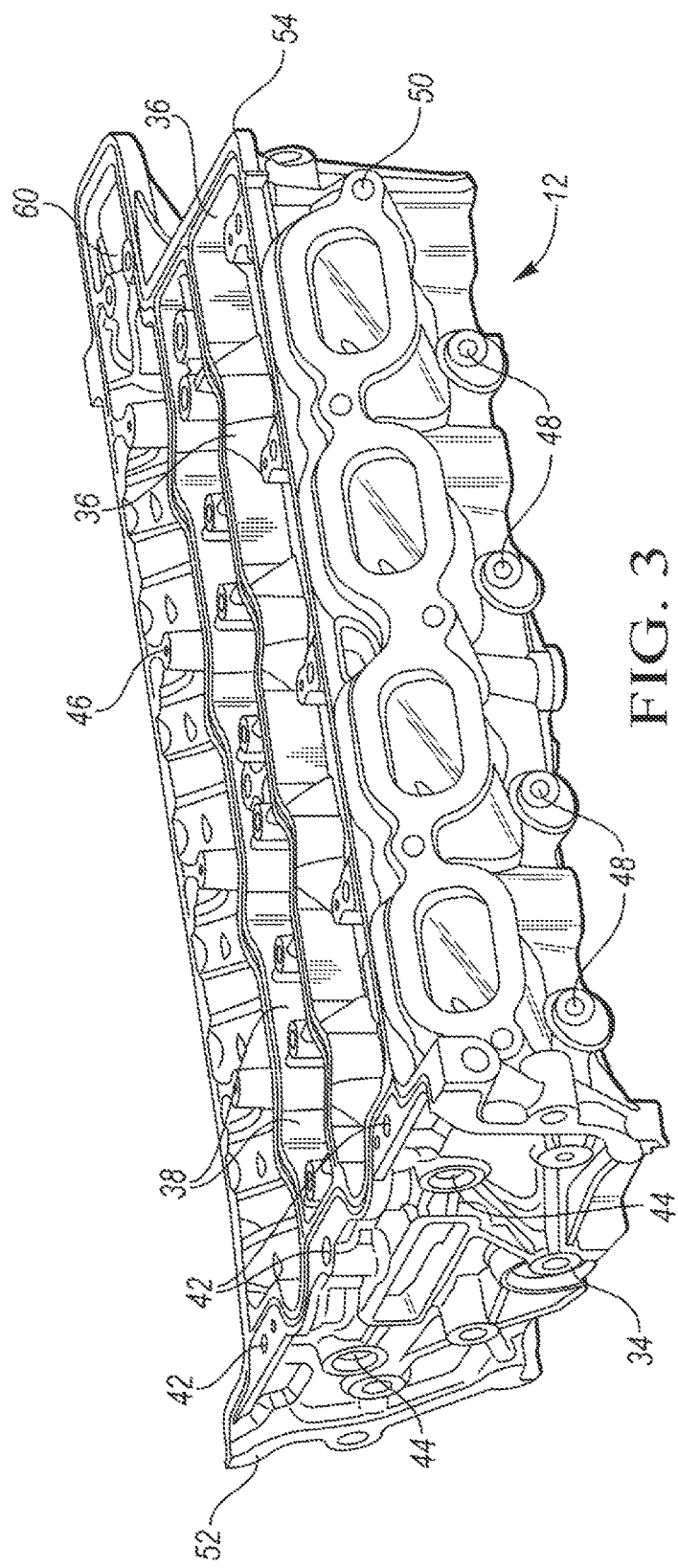
FIG. 3 depicts a perspective side view of a composite material external structure of a hybrid composite cylinder head in accordance with one embodiment.

As is illustrated in FIG. 3, the external polymer composite structure 12 may include a plurality of components. In one or more non-limiting embodiments, the external polymer composite structure 12 may include one or more water jacket core supports 34, one or more intake valve spring pockets 36, one or more spark plug and direct injection pockets 38, one or more fuel pump pedestal pockets, one or more oil feeds to the cam 42, one or more intake and exhaust oil feeds 44 for a hydraulic lash adjuster, an intake mounting port, one or more side direct injection mounting ports 48, one or more intake mounting ports 50, a front cover seal rail 52, a cam cover mounting rail 54, and/or one or more cam carrier mounting ports. It is contemplated that other parts of a cylinder head may be a part of the external polymer composite structure 12. For example, intake manifolds or a base head (not depicted) could be included in the external polymer composite structure 12.

In one or more embodiments, the method of making the composite cylinder head 1 includes the following steps. The internal metal structure 10 may be manufactured as one unit, for example by casting, monocasting, molding, welding, or forming by another method. Alternatively, individual portions of the hybrid composite cylinder head 1 may be produced separately and the internal metal structure 10 may be assembled from the individual portions. Preferably, the individual portions of the cylinder head 1 are molded together to form a uniform combustion chamber insert 14. For example, producing the fire deck 24 by monocasting or molding together with one or more additional portions as part of the combustion chamber insert 14 offers improved rigidity, strength, and flatness control.

Once the internal metal structure 10 is cast or otherwise produced, it is desirable to at least partially machine the internal metal structure 10. For example, the internal metal structure 10 may be machined to create one or more locators or other features which help to hold the internal metal structure 10 in place during thermosetting.

An additional concern to consider while producing the hybrid composite cylinder head 1 is that the internal metal structure 10 expands and shrinks faster than the external polymer composite structure 12. Therefore, the internal metal structure 10 could disengage from the external polymer composite structure 12 during use of the cylinder head 1. Thus, it is desirable in at least one embodiment to increase surface area of at least some areas of the internal metal structure 10. The surface area may be increased by adding texture to at least some areas of the internal metal structure 10. This can be done by a variety of methods, for example by roughening, serrating, micro-serrating, abrasive cutting, blasting, honing, electrical discharge machining, milling, etching, chemical milling, laser texturing, or by another process, or a combination thereof. At least in one embodiment, texture is added to the surface of the head bolt columns, which improves bond strength between the internal metal structure 10 and the composite material of the external polymer composite structure 12. The step of adding texture to a surface of the internal metal structure should be performed before the internal metal structure 10 is inserted into a die and before the internal metal structure 10 is overmolded by the composite material.

Furthermore, it is contemplated that the internal metal structure 10 may be subjected to additional treatment. In one or more embodiments, a coating ensuring better thermal management is applied to a surface of the internal metal structure 10 of the hybrid composite cylinder head 1 which is exposed to hot gasses.

Subsequently, the internal metal structure 10 is inserted in the die of the molding machine. The internal metal structure 10 is tempered. The die is closed. The composite material of the external polymer composite structure 12 is supplied into the die. The external polymer composite structure 12 is formed by molding during which the composite material cures. The composite material is being molded over the internal metal structure 10 placed in the die. The composite material may be molded by injection molding, compression molding, spin casting, or another molding method. The cure may be induced by heat of about 200° C. or more, by a chemical reaction, irradiation, or a combination thereof. The curing process transforms the thermosetting plastic to a hardened thermoset resin which has taken its final shape due to a cross-linking process. One or more catalysts and/or energy can be added during the reaction to cause the molecular chains to react at chemically active sites and link into a rigid 3-D structure which cannot be reheated to change its shape. After curing, the external polymer composite structure 12 is well suited for high-temperature applications.

Figure 4:
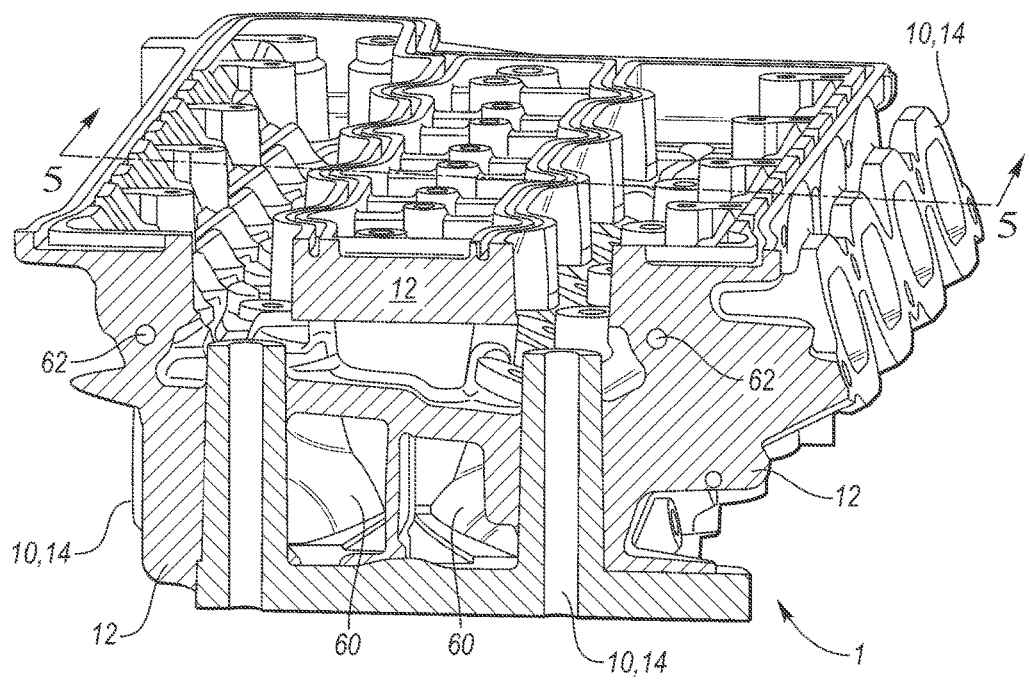
FIG. 4 depicts a partial cross section view and partial perspective front view of an assembled hybrid composite cylinder head including an internal metal structure and composite material exterior structure.
Figure 5:
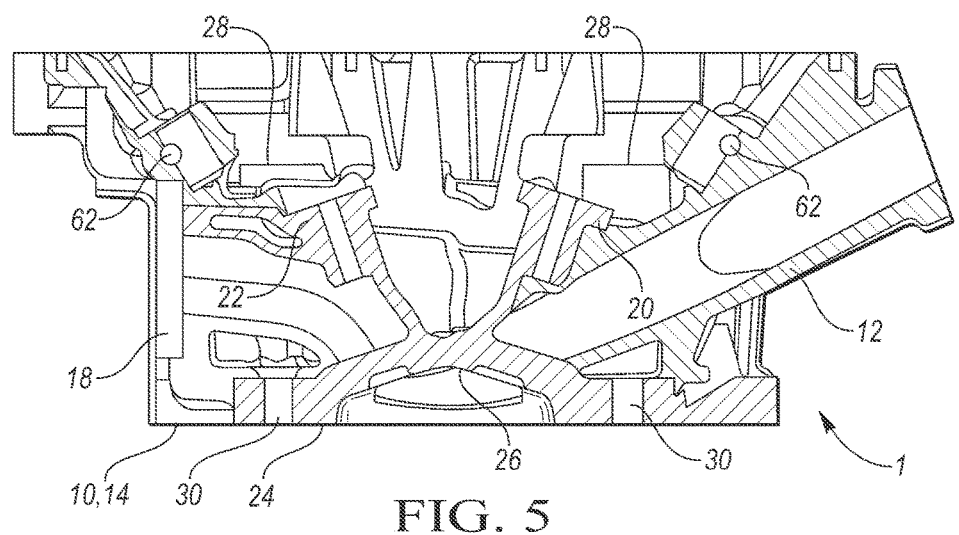
FIG. 5 shows a partial cross section view and partial perspective cross section view taken along line 5-5 of FIG. 4 of the assembled hybrid composite cylinder head.

In at least one embodiment, as illustrated in FIGS. 4 and 5, the resulting combustion chamber insert 14 is molded into the external polymer composite structure 12. The temperature is subsequently lowered, the dye die opened, the hybrid composite cylinder head 1 taken out and set at room temperature.

FIG. 4 illustrates the internal metal structure 10 and the external polymer composite structure 12 assembled in such a way as to create a water-tight seam to seal the cylinder head water jackets 60 within the cylinder head 1 assembly. As can be seen in FIG. 4, the water jackets 60 are molded as part of the external polymer composite structure 12. FIG. 5 illustrates a partial cross section view along line 5-5 of FIG. 4. As can be seen in FIGS. 4 and 5, the internal metal structure 10 is at least partially surrounded by the external polymer composite structure 12. FIG. 5 shows the following parts of the internal metal structure 10: a combustion chamber 26, two head bolt columns 28, the exhaust face 18, one intake valve spring seat 20, one exhaust valve spring seat 22, and two engine coolant ports 30 molded as part of the external polymer composite structure 12. The openings 62 in the composite material house an oil circuit.

A machine to produce a hybrid composite cylinder head 1 may be a machine including a cast or a mold for production of the internal metal structure 10 according to the method described above. An additional machine includes a mold machine for injection molding, compression molding, spin casting, or another molding technique for molding the composite material at least partially over the internal metal structure 10 according to the method describe above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine cylinder head comprising:
   an internal metal structure, forming an upper portion of a combustion chamber, formed from a metal material; and
   an external polymer composite structure formed from a polymer composite material,
   wherein the external polymer composite structure at least partially surrounds the internal metal structure.

2. The engine cylinder head of claim 1, wherein the polymer composite material includes a fiber material.

3. The engine cylinder head of claim 2, wherein the fiber material includes carbon fiber.

4. The engine cylinder head of claim 1, wherein the internal metal structure forms a combustion chamber insert.

5. The engine cylinder head of claim 1, wherein the internal metal structure includes a fire deck.

6. The engine cylinder head of claim 5, wherein the fire deck includes a plurality of engine coolant ports, a plurality of oil drain ports, or both.

7. The engine cylinder head of claim 1, wherein the internal metal structure is made from cast iron.

8. The engine cylinder head of claim 1, wherein the external polymer composite structure is made from a thermoset resin.

9. The engine cylinder head of claim 8, wherein the thermoset resin includes a polyester resin, an epoxy resin, a phenolic resin, a polyurethane, a polyimide, or a combination thereof.

10. The engine cylinder head of claim 9, wherein the thermoset resin is a polyester resin.

11. The engine cylinder head of claim 1, wherein the external polymer composite structure includes one or more water jacket core supports.

12. An engine cylinder head comprising:
    an internal metal structure formed from a metal material; and
    an external polymer composite structure formed from a polymer composite material,
    wherein the external polymer composite structure at least partially surrounds the internal metal structure and wherein the external polymer composite structure includes one or more intake and exhaust oil feeds for a hydraulic lash adjuster.

13. The engine cylinder head of claim 1, wherein the external polymer composite structure includes one or more spark plug pockets and one or more direct injection pockets.

14. An engine cylinder head comprising:
    an internal metal structure, arranged to form an upper portion of a combustion chamber, formed from a metal material and including a fire deck; and
    an external polymer composite structure formed from a polymer composite material including a fiber material and including one or more intake and exhaust oil feeds for a hydraulic lash adjuster, one or more spark plug pockets, and one or more direct injection pockets,
    wherein the external polymer composite structure at least partially surrounds the internal metal structure.

15. A method of forming an engine cylinder head comprising:
    forming an internal metal structure of a metal material arranged to form an upper portion of a combustion chamber; and
    molding an external polymer composite structure of a polymer composite material over the internal metal structure so that the external polymer composite structure at least partially surrounds the internal metal structure.

16. The method of claim 15, wherein the polymer composite material includes a fiber material.

17. The method of claim 15, wherein the internal metal structure forming step includes casting the internal metal structure.

18. The method of claim 15, further comprising forming one or more components of the internal metal structure.

19. The method of claim 15, wherein the internal metal structure forming step includes machining one or more components of the internal metal structure.

20. The method of claim 15, further comprising adding a coating to a surface of the internal metal structure.

* * * * *